US011995896B2

(12) United States Patent
Park

(10) Patent No.: US 11,995,896 B2
(45) Date of Patent: May 28, 2024

(54) METHOD OF ESTIMATING CURVATURE OF LANE IN FRONT OF VEHICLE AND LANE TRACKING CONTROL SYSTEM USING THE SAME

(71) Applicant: HYUNDAI MOBIS Co., Ltd., Seoul (KR)

(72) Inventor: Ji In Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 179 days.

(21) Appl. No.: 17/668,628

(22) Filed: Feb. 10, 2022

(65) Prior Publication Data

US 2022/0262137 A1    Aug. 18, 2022

(30) Foreign Application Priority Data

Feb. 15, 2021    (KR) .................. 10-2021-0019886

(51) Int. Cl.
| | | |
|---|---|---|
| *G06V 20/56* | (2022.01) | |
| *B62D 15/02* | (2006.01) | |
| *G06T 7/20* | (2017.01) | |
| *G06T 7/50* | (2017.01) | |
| *G06T 7/64* | (2017.01) | |
| *B60W 40/072* | (2012.01) | |

(52) U.S. Cl.
CPC ......... *G06V 20/588* (2022.01); *B62D 15/025* (2013.01); *B62D 15/029* (2013.01); *G06T 7/20* (2013.01); *G06T 7/50* (2017.01); *G06T 7/64* (2017.01); *B60W 40/072* (2013.01); *B60W 2420/403* (2013.01); *B60W 2520/10* (2013.01); *B60W 2552/30* (2020.02); *G06T 2207/30256* (2013.01)

(58) Field of Classification Search
CPC .................................................. B60W 40/072
See application file for complete search history.

(56) References Cited

U.S. PATENT DOCUMENTS

| | | | | |
|---|---|---|---|---|
| 2020/0010073 A1* | 1/2020 | Ryu | .................. | G06V 10/242 |
| 2021/0339731 A1* | 11/2021 | Ryu | .................. | B60W 30/12 |
| 2022/0203983 A1* | 6/2022 | Saito | .................. | B60T 7/22 |

FOREIGN PATENT DOCUMENTS

| | | |
|---|---|---|
| JP | 6637953 B2 | 1/2020 |
| KR | 10-1358329 B1 | 2/2014 |
| KR | 10-1399670 B1 | 5/2014 |

* cited by examiner

*Primary Examiner* — Sizo B Vilakazi
(74) *Attorney, Agent, or Firm* — MORGAN, LEWIS & BOCKIUS LLP

(57) ABSTRACT

A method of estimating curvature of a lane in front of a vehicle includes obtaining a reference distance, a reference angle, a reference curvature, and a reference change-rate, based on an image captured by a front camera of the vehicle; calculating respective estimation distances, by which the specific portion of the vehicle will be estimated to be spaced apart from the first extension line, at a plurality of target distances, on a transverse straight-line of the vehicle spaced apart from the vehicle by a predetermined target distance in the forward direction along a second extension line extending from the specific portion of the vehicle in the forward direction of the vehicle, based on the reference distance, the reference angle, the reference curvature, and the reference change-rate; and calculating the curvature of the lane in front of the vehicle based on the respective estimation distances at the plurality of target distances.

14 Claims, 3 Drawing Sheets

METHOD OF ESTIMATING CURVATURE OF LANE IN FRONT OF VEHICLE AND LANE TRACKING CONTROL SYSTEM USING THE SAME

CROSS REFERENCE TO RELATED APPLICATION

The present application claims the benefit of priority to Korean Patent Application No. 10-2021-0019886, filed Feb. 15, 2021, the entire contents of which is incorporated herein for all purposes by this reference.

BACKGROUND

Technical Field

The disclosure relates to a technology for estimating the frontward curvature of a lane in which a vehicle is driving.

Description of the Related Art

Various driver-assistance technologies or autonomous-driving technologies are currently being developed and used. Among them, there is a lane-tracking control system in which a front camera of a vehicle is employed to track the middle of a traveling lane so that the vehicle can be automatically driving.

In such a lane-tracking control system, a curvature of a lane captured by a front camera is calculated, and a vehicle's lane-tracking control is performed even in a curved road based on the calculated curvature.

However, it is identified based on the current technology that there is a limit to the lane-tracking control in a sharp-curve section, in which a lane where a vehicle is driving is suddenly increased in curvature, and thus the control is stopped.

At present, the curvature of the lane to be used in the lane-tracking control is generally measured in a section between the front wheel and front end of the vehicle, and therefore the lane-tracking control is mostly discontinued immediately before encountering a sharp curve or immediately after entering the sharp-curve section to some extent. In this case, there is a problem that a driver who has hitherto relied on lane-tracking control has to hurriedly and properly control a steering wheel.

Matters described as the related art are provided merely for promoting understanding for the background of the disclosure, and should not be taken as the prior art already known to a person having ordinary knowledge in the art.

SUMMARY

The disclosure is conceived to solve the foregoing problems, and an aspect of the disclosure is to provide a method of estimating the curvature of a lane in front of a vehicle, in which the curvature of a lane in front of a vehicle that is driving is estimated in advance, and thus a driver is guided to control a steering wheel leisurely before entering a sharp-curve section, so that lane-tracking control can become safer, thereby preventing accidents and ultimately significantly improving the vehicle in reliability and marketability.

According to one aspect of the disclosure, a method of estimating curvature of a lane in front of a vehicle includes the steps of:

obtaining a reference distance, i.e., a vehicle transverse distance from a lane-tracking control reference-point to a specific portion of a vehicle, a reference angle, i.e., an angle between a first extension line extending from the lane-tracking control reference-point in a forward direction of the vehicle and the lane, a reference curvature, i.e., a curvature of lane at the lane-tracking control reference-point, and a reference change-rate, i.e., a change rate of the reference curvature, based on an image captured by a front camera of the vehicle;

calculating estimation distances, by which the specific portion of the vehicle will be estimated to be spaced apart from the first extension line, with respect to a plurality of target distances, on a transverse straight-line of the vehicle spaced apart from the vehicle by a predetermined target distance in the forward direction along a second extension line extending from the specific portion of the vehicle in the forward direction of the vehicle, based on the reference distance, the reference angle, the reference curvature, and the reference change-rate; and calculating the curvature of the lane in front of the vehicle based on the plurality of estimation distances with respect to the plurality of target distances.

The target distances may include three distances, i.e., a first target distance, a second target distance, and a third target distance;

the first target distance may be calculated by the second target distance−a range distance; and the third target distance may be calculated by the second target distance+the range distance.

The estimation distances may include a first estimation distance for the first target distance, a second estimation distance for the second target distance, and a third estimation distance for the third target distance;

the first target distance and the first estimation distance may form first coordinates;

the second target distance and the second estimation distance may form second coordinates;

the third target distance and the third estimation distance may form third coordinates; and the calculating the curvature of the lane in front of the vehicle includes obtaining an equation of a circle that passes through the first coordinates, the second coordinates and the third coordinates, and calculating the curvature of the lane in front of the vehicle based on a radius of the circle.

The first estimation distance, the second estimation distance and the third estimation distance may be calculated by the following equations:

$$Y1 = C0 + C1*(X-a) + C2*(X-a)^2 + C3*(X-a)^3$$

$$Y2 = C0 + C1*X + C2*X^2 + C3*X^3$$

$$Y3 = C0 + C1*(X+a) + C2*(X+a)^2 + C3*(X+a)^3$$

where,

Y1: first estimation distance, Y2: second estimation distance, and Y3: third estimation distance X: second target distance a: range distance C0: reference distance, C1: reference angle, C2: reference curvature, and C3: reference change-rate.

When a signal reliability level of the front camera is lower than or equal to a predetermined level, the third target distance may be calculated by the second target distance−2*the range distance.

The range distance may be calculated by the second target distance*a reference percentage; and the reference percentage may range from 5% to 20%.

The second target distance may be calculated by multiplying the driving speed of the vehicle by a period of time up to a point in time at which estimation is desired.

Further, according to the aspect of the disclosure, a lane-tracking control system includes a front camera of a vehicle;

an image analyzer configured to obtain a reference distance, i.e., a vehicle transverse distance from a lane-tracking control reference-point to a specific portion of a vehicle, a reference angle, i.e., an angle between a first extension line extending from the lane-tracking control reference-point in a forward direction of the vehicle and the lane, a reference curvature, i.e., a curvature of the lane at the lane-tracking control reference-point, and a reference change-rate, i.e., a change rate of the reference curvature, based on an image captured by a front camera of the vehicle;

an estimation distance calculator configured to calculate estimation distances, by which the specific portion of the vehicle V will be estimated to be spaced apart from the first extension line L1, with respect to a plurality of target distances, on a transverse straight-line of the vehicle spaced apart from the vehicle by a predetermined target distance in the forward direction along a second extension line extending from the specific portion of the vehicle in the forward direction of the vehicle, based on the reference distance, the reference angle, the reference curvature, and the reference change-rate; and a curvature calculator configured to calculate the curvature of the lane in front of the vehicle based on the plurality of estimation distances with respect to the plurality of target distances.

The target distances may include three distances, i.e., a first target distance, a second target distance, and a third target distance;

the first target distance may be calculated by the second target distance−a range distance; and the third target distance may be calculated by the second target distance+the range distance.

The estimation distances may include a first estimation distance for the first target distance, a second estimation distance for the second target distance, and a third estimation distance for the third target distance;

the first target distance and the first estimation distance may form first coordinates;

the second target distance and the second estimation distance may form second coordinates;

the third target distance and the third estimation distance may form third coordinates; and the curvature calculator may be configured to obtain an equation of a circle that passes through the first coordinates, the second coordinates and the third coordinates, and calculate the curvature of the lane in front of the vehicle based on a radius of the circle.

The curvature calculator may be configured to calculate the first estimation distance, the second estimation distance and the third estimation distance by the following equations:

$Y1=C0+C1*(X-a)+C2*(X-a)^2+C3*(X-a)^3$ $Y2=C0+C1*X+C2*X^2+C3*X^3$ $Y3=C0+C1*(X+a)+C2*(X+a)^2+C3*(X+a)^3$ where, Y1: first estimation distance, Y2: second estimation distance, and Y3: third estimation distance X: second target distance a: range distance C0: reference distance, C1: reference angle, C2: reference curvature, and C3: reference change-rate.

When a signal reliability level of the front camera is lower than or equal to a predetermined level, the third target distance may be calculated by the second target distance−2*the range distance.

The range distance may be calculated by the second target distance*a reference percentage; and the reference percentage may range from 5% to 20%.

The second target distance may be calculated by multiplying the driving speed of the vehicle by a period of time up to a point in time at which estimation is desired.

The lane-tracking control system may further include a control discontinuer configured to hand over authority for controlling a steering wheel to a driver while informing the driver of a dangerous situation when the curvature calculated by the curvature calculator is smaller than or equal to a predetermined dangerous reference curvature.

DETAILED DESCRIPTION

Figure 1:
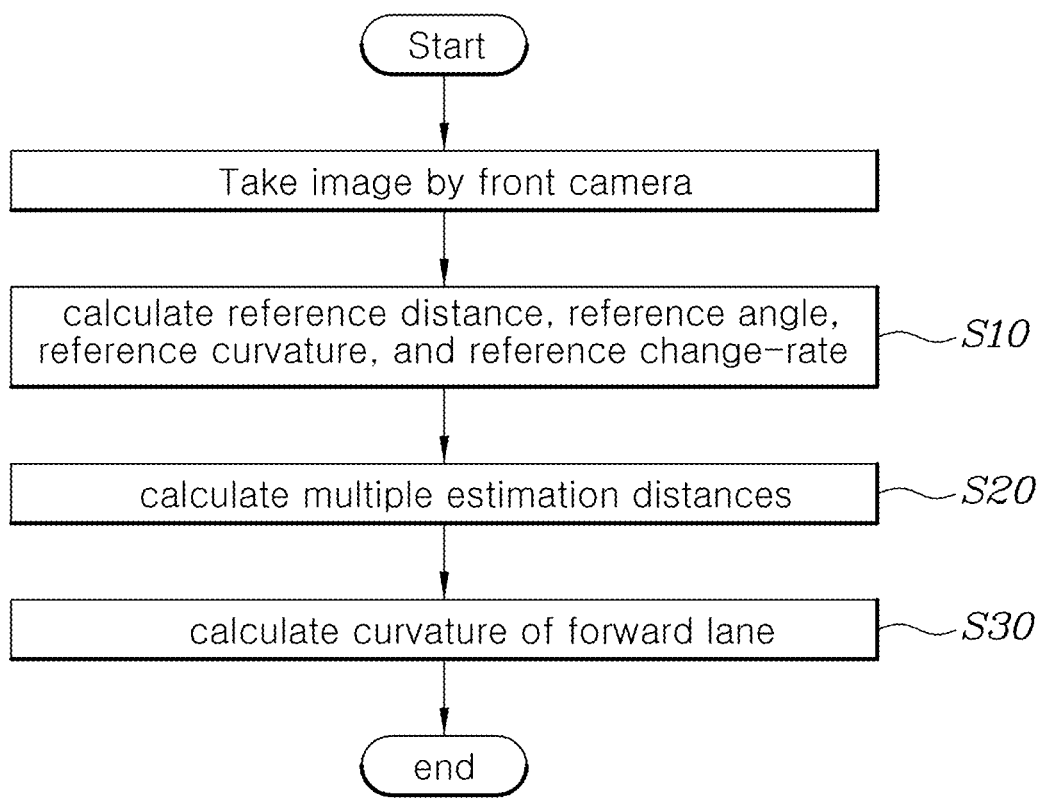
FIG. 1 is a flowchart for describing a method of estimating the curvature of a lane in front of a vehicle according to the disclosure.

Regarding embodiments of the disclosure disclosed in this specification or application, the specific structural or functional description is merely illustrative for the purpose of describing the embodiments of the disclosure, and embodiments of the disclosure may be implemented in various forms but not be construed as being limited to the embodiments set forth in this specification or application.

Because the embodiments of the disclosure may be variously modified and have various forms, specific exemplary embodiments will be illustrated in the drawings and described in detail in this specification or application. However, it should be understood that embodiments of the disclosure are intended not to be limited to the specific embodiments but to cover all modifications, equivalents or alternatives without departing from the spirit and technical scope of the disclosure.

Terms such as "first" and/or "second" are used herein merely to describe a variety of elements, but the elements are not limited by these terms. Such terms are used only for the purpose of distinguishing one element from another element. For example, without departing from the conceptual scope of the disclosure, a first element may be referred to as a second, and vice versa.

When a certain element is referred to as being "connected to" or "coupled to" another element, it will be understood that they may be directly connected to or coupled to each other but or intervening elements may be present therebetween. On the other hand, when a certain element is referred to as being "directly connected to" or "directly coupled to" another element, it will be understood that no intervening elements are present therebetween. Other expressions describing relationships between elements, such as "between," "immediately between," "adjacent to," "directly adjacent to," or etc. may also be construed in the same manner.

Terms used in this specification are merely used for explaining specific embodiments, but not intended to limit the disclosure. Unless the context clearly dictates otherwise, singular forms include plural forms as well. It is to be understood that terms "include," "have," etc. as used herein specify the presence of stated features, integers, steps, operations, elements, components, or combination thereof, but do not preclude the presence or addition of one or more other features, integers, steps, operations, elements, components or combination thereof.

Unless defined otherwise, all terms used herein including technical or scientific terms have the same meanings as those generally understood by a person having ordinary knowledge in the art to which the disclosure pertains. The terms such as those defined in generally used dictionaries are construed to have meanings matching that in the context of related technology and, unless clearly defined otherwise, are not construed to be ideally or excessively formal.

Below, the disclosure will be described in detail by describing exemplary embodiments with reference to the accompanying drawings. Like reference numerals in the drawings refer to like numerals.

Figure 2:
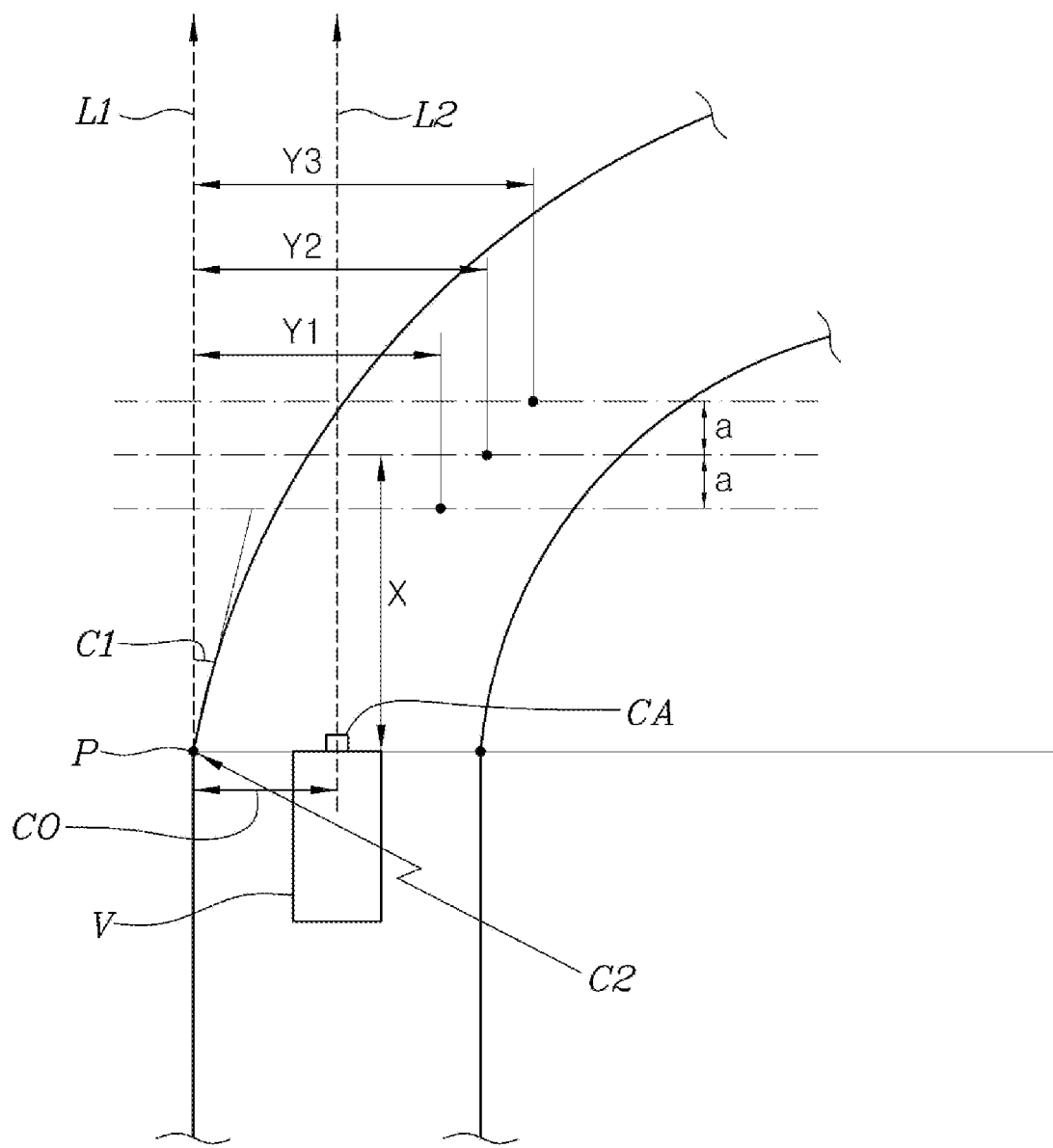
FIG. 2 is a diagram for the method of estimating the curvature of the lane in FIG. 1.

Referring to FIGS. 1 and 2, a method of estimating curvature of a lane in front of a vehicle according to an embodiment of the disclosure includes the steps of obtaining a reference distance C0, i.e., a vehicle transverse distance from a lane-tracking control reference-point P to a specific portion of a vehicle V, a reference angle C1, i.e., an angle between a first extension line L1 extending from the lane-tracking control reference-point P in a forward direction of the vehicle V and the lane, a reference curvature C2, i.e., the curvature of the lane at the lane-tracking control reference-point P, and a reference change-rate C3, i.e., a change rate of the reference curvature C2 based on an image captured by a front camera CA of the vehicle V (S10); calculating estimation distances, by which the specific portion of the vehicle V will be estimated to be spaced apart from the first extension line L1, with respect to a plurality of target distances, on a transverse straight-line of the vehicle V spaced apart from the vehicle V by a predetermined target distance in the forward direction along a second extension line L2 extending from the specific portion of the vehicle V in the forward direction of the vehicle V, based on the reference distance C0, the reference angle C1, the reference curvature C2, and the reference change-rate C3 (S20); and calculating the curvature of the lane in front of the vehicle based on the plurality of estimation distances with respect to the plurality of target distances.

In other words, the disclosure is to calculate the reference distance C0, the reference angle C1, the reference curvature C2, and the reference change-rate C3 by analyzing information about the lane in front of the vehicle captured by the front camera CA provided at the front of the vehicle; calculate the target distances, at which it is desired to know the curvature of the forward lane, and the plurality of estimation distances around the target distances, based on the reference distance C0, the reference angle C1, the reference curvature C2, and the reference change-rate C3; and calculate the curvature of the forward lane based on these target distances and the estimation distances.

Here, the lane-tracking control reference-point P refers to a measurement position for the curvature of the lane, which has conventionally been used to perform the lane-tracking control, and is generally set as a point where a straight line extending in the transverse direction of the vehicle meets the lane in a section between the front wheel and front end of the vehicle, which is illustrated as 'P' in FIG. 2.

Further, the specific portion of the vehicle V may correspond to the front camera CA, and may additionally include any position in the front of a vehicle body.

The target distances include three distances, i.e., a first target distance, a second target distance, and a third target distance, in which the first target distance is calculated by the second target distance−a range distance; and the third target distance is calculated by the second target distance+the range distance.

In other words, referring to FIG. 2, the first target distance is illustrated as 'X−a', the second target distance is illustrated as 'X', and the third target distance is illustrated as 'X+a', with which three coordinates for determining the curvature are easily changed and calculated based on simple calculation for the position where it is desired to know the curvature of the lane, by designating a forward distance, at which it is desired to know the curvature of the lane, as the second target distance X, and adjusting the range distance a.

The estimation distances include a first estimation distance for the first target distance, a second estimation distance for the second target distance, and a third estimation distance for the third target distance.

In other words, the first estimation distance, the second estimation distance, and the third estimation distance may be calculated by the following equations:

$$Y1 = C0 + C1*(X-a) + C2*(X-a)^2 + C3*(X-a)^3$$

$$Y2 = C0 + C1*X + C2*X^2 + C3*X^3$$

$$Y3 = C0 + C1*(X+a) + C2*(X+a)^2 + C3*(X+a)^3$$

where,
Y1: first estimation distance, Y2: second estimation distance, and Y3: third estimation distance
X: second target distance
a: range distance
C0: reference distance, C1: reference angle, C2: reference curvature, and C3: reference change-rate.

The first target distance and the first estimation distance constitute the first coordinates, the second target distance and the second estimation distance constitute the second coordinates, and the third target distance and the third estimation distance constitute the third coordinates.

In the step of calculating the curvature of the lane in front of the vehicle, the equation of a circle that passes through the first coordinates, the second coordinates and the third coordinates is calculated, and the radius of the circle is used in calculating the curvature of the lane in front of the vehicle.

In other words, the equation of a circle that passes through the first coordinates (X−a, Y1), the second coordinates (X, Y2) and the third coordinates (X+a, Y3) is calculated to obtain the radius of the circle, and the radius is used in calculating the curvature at the corresponding lane position.

When signal reliability of the front camera CA is lower than or equal to a predetermined level, for example, when the reliability of an image captured by the front camera CA is lowered due to, e.g., backlighting, mist, etc. and it is thus identified that the reliability is different from that under a usual condition, the third target distance is calculated by the second target distance−2*the range distance.

In other words, the position where the curvature is measured is modified to be closer to the vehicle than that under the usual condition and thus cope with the lowered signal reliability of the front camera CA.

Accordingly, to follow the foregoing purposes, a level for determining the signal reliability of the front camera CA may be designed and determined based on many experiments and analyses to determine whether there is a need of modifying the position, at which the curvature will be estimated, to be closer to the vehicle.

Meanwhile, the range distance a may be calculated by the second target distance*a reference percentage, in which the reference percentage may range from 5% to 20%.

In other words, the range distance a refers to an adjustable value, which is set in proportion to the second target distance X, so that three coordinates can be obtained to determine the curvature of the lane in a more extended section as farther away from the vehicle V in a forward direction.

The second target distance may be set to be calculated by multiplying the driving speed of the vehicle V by a period of time up to a point in time at which the estimation is desired.

In other words, the second target distance is obtained by multiplying the current driving speed of the vehicle V by a period of time from a current point to a point for the estimation, and then the curvature is calculated based on the second target distance, thereby previously estimating the curvature of the lane at a position through which the vehicle V will pass at the point in time at which the estimation is desired.

Of course, when the previously estimated curvature of the lane in front of the vehicle is smaller than or equal to a predetermined dangerous reference-curvature, authority for controlling a steering wheel is transferred to a driver while informing the driver of a dangerous situation in advance, so that the driver can have enough time to properly control the steering wheel, thereby preventing the vehicle from accidents and offering more reliable driving experience to the driver.

Accordingly, to follow the foregoing purposes, the dangerous reference curvature may be set to inform the driver of the presence of a sharp-curve section and identify whether to hand over the authority for controlling the steering wheel to the driver.

Figure 3:
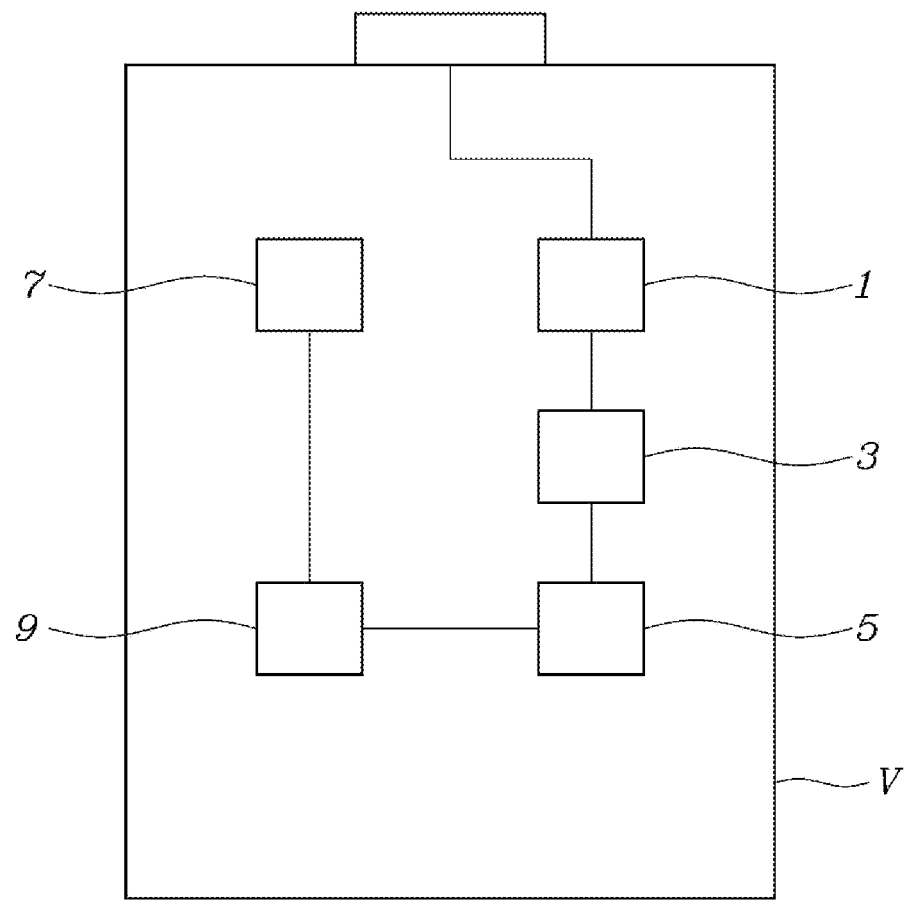
FIG. 3 is a diagram illustrating the configuration of a lane-tracking control system according to the disclosure.

Referring to FIG. 3, a lane-tracking control system using the foregoing method of estimating the curvature of the lane in front of a vehicle according to the disclosure may include a front camera CA of a vehicle V; an image analyzer 1 obtaining a reference distance C0, i.e., a vehicle transverse distance from a lane-tracking control reference-point P to a specific portion of a vehicle V, a reference angle C1, i.e., an angle between a first extension line L1 extending from the lane-tracking control reference-point P in a forward direction of the vehicle V and the lane, a reference curvature C2, i.e., the curvature of the lane at the lane-tracking control reference-point P, and a reference change-rate C3, i.e., a change rate of the reference curvature C2 based on an image captured by a front camera CA of the vehicle V; an estimation distance calculator 3 calculating estimation distances, by which the specific portion of the vehicle V will be estimated to be spaced apart from the first extension line L1, with respect to a plurality of target distances, on a transverse straight-line of the vehicle V spaced apart from the vehicle V by a predetermined target distance in the forward direction along a second extension line L2 extending from the specific portion of the vehicle V in the forward direction of the vehicle V, based on the reference distance C0, the reference angle C1, the reference curvature C2, and the reference change-rate C3; and a curvature calculator 5 calculating the curvature of the lane in front of the vehicle based on the plurality of estimation distances with respect to the plurality of target distances. According to an exemplary embodiment of the present disclosure, the lane-tracking control system may include a processor (e.g., computer, microprocessor, CPU, ASIC, circuitry, logic circuits, etc.) and an associated non-transitory memory storing software instructions which, when executed by the processor, provides the functionalities of the aforementioned image analyzer 1, the estimation distance calculator 3, and the curvature calculator 5. Herein, the memory and the processor may be implemented as separate semiconductor circuits. Alternatively, the memory and the processor may be implemented as a single integrated semiconductor circuit. The processor may embody one or more processor(s).

The target distances may include three distances, i.e., a first target distance, a second target distance, and a third target distance, in which the first target distance may be calculated by the second target distance−a range distance; and the third target distance may be calculated by the second target distance+the range distance.

The estimation distances may include a first estimation distance for the first target distance, a second estimation distance for the second target distance, and a third estimation distance for the third target distance; the first target distance and the first estimation distance may form the first coordinates, the second target distance and the second estimation distance may constitute the second coordinates, and the third target distance and the third estimation distance may constitute the third coordinates; and The curvature calculator 5 may be configured to calculate the equation of a circle that passes through the first coordinates, the second coordinates and the third coordinates, and calculate the curvature of the lane in front of the vehicle based on the radius of the circle.

The curvature calculator 5 may be configured to calculate the first estimation distance and the second estimation distance and the third estimation distance by the following equations:

$$Y1 = C0 + C1*(X-a) + C2*(X-a)^2 + C3*(X-a)^3$$

$$Y2 = C0 + C1*X + C2*X^2 + C3*X^3$$

$$Y3 = C0 + C1*(X+a) + C2*(X+a)^2 + C3*(X+a)^3$$

where,
Y1: first estimation distance, Y2: second estimation distance, and Y3: third estimation distance
X: second target distance
a: range distance
C0: reference distance, C1: reference angle, C2: reference curvature, and C3: reference change-rate.

When signal reliability of the front camera CA is lower than or equal to a predetermined level,
the third target distance may be calculated by the second target distance−2*the range distance.

The range distance may be calculated by the second target distance*a reference percentage, in which the reference percentage may range from 5% to 20%.

The second target distance may be calculated by multiplying the driving speed of the vehicle V by a period of time up to a point in time at which the estimation is desired.

Further, the system according to the disclosure may include a control discontinuer 7 configured to hand over authority for controlling a steering wheel to a driver while informing the driver of a dangerous situation in advance when the curvature of the lane in front of the vehicle previously estimated by the curvature calculator 5 is smaller than or equal to a predetermined dangerous reference-curvature.

In other words, as illustrated in FIG. 3, a controller 9, which has hitherto been performing the lane-tracking control, receives the curvature of the lane around the second target distance in front of the vehicle from the curvature calculator 5, identifies whether the received curvature is smaller than or equal to the dangerous reference curvature, and operates the control discontinuer 7 to inform the driver that the received curvature is smaller than or equal to the dangerous reference curvature and hand over the authority for controlling the steering wheel to the driver when the received curvature is smaller than or equal to the dangerous reference curvature.

In this way, the lane-tracking control system according to the disclosure warns a driver about a sharp-curve section in advance before a vehicle enters the sharp-curve section, and hands over the authority for controlling the steering wheel to the driver, so that lane-tracking driving can become safer, thereby improving the vehicle in reliability and safety.

According to the disclosure, the curvature of a lane in front of a vehicle that is driving is estimated in advance, and thus a driver is guided to control a steering wheel leisurely before entering a sharp-curve section, so that lane-tracking control can become safer, thereby preventing accidents and ultimately significantly improving the vehicle in reliability and marketability.

Although specific embodiments of the disclosure are illustrated and described, it will be obvious to a person having ordinary knowledge in the art that a variety of improvements and changes can be made in the disclosure without departing from the technical idea of the disclosure defined in the appended claims.

What is claimed is:

1. A method of estimating curvature of a lane in front of a vehicle, the method comprising:
    obtaining a vehicle transverse distance from a lane-tracking control reference-point to a specific portion of a vehicle as a reference distance, an angle between a first extension line extending from the lane-tracking control reference-point in a forward direction of the vehicle and the lane as a reference angle, a curvature of a lane at the lane-tracking control reference-point as a reference curvature, and a change rate of the reference curvature as a reference change-rate, based on an image captured by a front camera of the vehicle;
    calculating respective estimation distances at a plurality of target distances, based on the reference distance, the reference angle, the reference curvature, and the reference change-rate, wherein each of the plurality of target distances is a predetermined target distance from the vehicle along a second extension line extending from the specific portion of the vehicle in the forward direction, and each of the estimation distances is a transverse distance by which the specific portion of the vehicle is estimated to be spaced apart from the first extension line along a transverse straight-line distanced from the vehicle in the forward direction by a corresponding target distance;
    calculating the curvature of the lane in front of the vehicle based on the respective estimation distances at the plurality of target distances; and
    handing authority for controlling a steering wheel over to a driver while informing the driver of a dangerous situation when the calculated curvature of the lane is smaller than or equal to a predetermined dangerous reference-curvature.

2. The method according to claim 1, wherein:
    the plurality of target distances comprise three distances including a first target distance, a second target distance, and a third target distance,
    the first target distance is calculated by the second target distance−a range distance, and the third target distance is calculated by the second target distance+the range distance.

3. The method according to claim 2, wherein:
    the estimation distances comprise a first estimation distance at the first target distance, a second estimation distance at the second target distance, and a third estimation distance at the third target distance,
    the first target distance and the first estimation distance constitute first coordinates,
    the second target distance and the second estimation distance constitute second coordinates,
    the third target distance and the third estimation distance constitute third coordinates, and
    the calculating the curvature of the lane in front of the vehicle comprises obtaining an equation of a circle that passes through the first coordinates, the second coordinates and the third coordinates, and calculating the curvature of the lane in front of the vehicle based on a radius of the circle.

4. The method according to claim 3, wherein the first estimation distance, the second estimation distance and the third estimation distance are calculated by the following equations:

$$Y1 = C0 + C1*(X-a) + C2*(X-a)^2 + C3*(X-a)^3$$

$$Y2 = C0 + C1*X + C2*X^2 + C3*X^3$$

$$Y3 = C0 + C1*(X+a) + C2*(X+a)^2 + C3*(X+a)^3$$

where,
Y1: the first estimation distance, Y2: the second estimation distance, and Y3: the third estimation distance
X: the second target distance
a: the range distance
C0: the reference distance, C1: the reference angle, C2: the reference curvature, and C3: the reference change-rate.

5. The method according to claim 2, wherein, when a signal reliability level of the front camera is lower than or equal to a predetermined level,
    the third target distance is calculated by the second target distance−2*the range distance.

6. The method according to claim 2, wherein:
    the range distance is calculated by the second target distance*a reference percentage, and
    the reference percentage ranges from 5% to 20%.

7. The method according to claim 2, wherein the second target distance is calculated by multiplying a driving speed of the vehicle by a period of time up to a point in time at which estimation is desired.

8. A lane-tracking control system comprising:
    a front camera of a vehicle;
    an image analyzer configured to obtain a vehicle transverse distance from a lane-tracking control reference-point to a specific portion of a vehicle as a reference distance, an angle between a first extension line extending from the lane-tracking control reference-point in a forward direction of the vehicle and the lane as a reference angle, a curvature of a lane at the lane-tracking control reference-point as a reference curvature, and a change rate of the reference curvature as a reference change-rate, based on an image captured by a front camera of the vehicle;

an estimation distance calculator configured to calculate respective estimation distances at a plurality of target distances, based on the reference distance, the reference angle, the reference curvature, and the reference change-rate, wherein each of the plurality of target distances is a predetermined target distance from the vehicle along a second extension line extending from the specific portion of the vehicle in the forward direction, and each of the estimation distances is a transverse distance by which the specific portion of the vehicle is estimated to be spaced apart from the first extension line along a transverse straight-line distanced from the vehicle in the forward direction by a corresponding target distance;

a curvature calculator configured to calculate the curvature of the lane in front of the vehicle based on the calculated estimation distances at the plurality of target distances; and a control discontinuer configured to hand authority for controlling a steering wheel over to a driver while informing the driver of a dangerous situation when the curvature calculated by the curvature calculator is smaller than or equal to a predetermined dangerous reference-curvature.

9. The lane-tracking control system according to claim 8, wherein
the plurality of target distances comprise three distances including a first target distance, a second target distance, and a third target distance;
the first target distance is calculated by the second target distance−a range distance; and
the third target distance is calculated by the second target distance+the range distance.

10. The lane-tracking control system according to claim 9, wherein:
the estimation distances comprise a first estimation distance at the first target distance, a second estimation distance at the second target distance, and a third estimation distance at the third target distance,
the first target distance and the first estimation distance constitute first coordinates,
the second target distance and the second estimation distance constitute second coordinates,
the third target distance and the third estimation distance constitute third coordinates, and
the curvature calculator is further configured to obtain an equation of a circle that passes through the first coordinates, the second coordinates and the third coordinates, and calculate the curvature of the lane in front of the vehicle based on a radius of the circle.

11. The lane-tracking control system according to claim 10, wherein the curvature calculator is further configured to calculate the first estimation distance, the second estimation distance and the third estimation distance by the following equations:

$$Y1 = C0 + C1*(X-a) + C2*(X-a)^2 + C3*(X-a)^3$$

$$Y2 = C0 + C1*X + C2*X^2 + C3*X^3$$

$$Y3 = C0 + C1*(X+a) + C2*(X+a)^2 + C3*(X+a)^3$$

where,
Y1: the first estimation distance, Y2: the second estimation distance, and Y3: the third estimation distance
X: the second target distance
a: the range distance
C0: the reference distance, C1: the reference angle, C2: the reference curvature, and C3: the reference change-rate.

12. The lane-tracking control system according to claim 9, wherein, when a signal reliability level of the front camera is lower than or equal to a predetermined level, the third target distance is calculated by the second target distance−2*the range distance.

13. The lane-tracking control system according to claim 9, wherein:
the range distance is calculated by the second target distance*a reference percentage, and
the reference percentage ranges from 5% to 20%.

14. The lane-tracking control system according to claim 9, wherein
the second target distance is calculated by multiplying a driving speed of the vehicle by a period of time up to a point in time at which estimation is desired.

* * * * *